(12) United States Patent
Dhaens et al.

(10) Patent No.: US 12,291,072 B2
(45) Date of Patent: May 6, 2025

(54) AIR-SPRING ASSEMBLY

(71) Applicant: DRiV Automotive Inc., Skokie, IL (US)

(72) Inventors: Miguel Dhaens, Lommel (BE); Monzer Al Sakka, Sint-Truiden (BE); Emilie Florence Simone Boulay, Cortil-Wodon (BE); Vytautas Bucinskas, Vilnius (LT)

(73) Assignee: DRiV Automotive Inc., Skokie, IL (US)

( * ) Notice: Subject to any disclaimer, the term of this patent is extended or adjusted under 35 U.S.C. 154(b) by 466 days.

(21) Appl. No.: 17/823,156

(22) Filed: Aug. 30, 2022

(65) Prior Publication Data
US 2024/0066940 A1     Feb. 29, 2024

(51) Int. Cl.
| | |
|---|---|
| *B60G 17/052* | (2006.01) |
| *B60G 11/27* | (2006.01) |
| *B60G 11/30* | (2006.01) |

(52) U.S. Cl.
CPC .......... *B60G 17/0528* (2013.01); *B60G 11/27* (2013.01); *B60G 11/30* (2013.01); *B60G 2202/152* (2013.01)

(58) Field of Classification Search
CPC .... B60G 17/0528; B60G 11/27; B60G 11/30; B60G 2202/152
See application file for complete search history.

(56) References Cited

U.S. PATENT DOCUMENTS

| | | | | | |
|---|---|---|---|---|---|
| 2,926,011 | A | * | 2/1960 | Slemmons | B60G 11/27 280/124.157 |
| 6,290,244 | B1 | * | 9/2001 | Hosoya | B60G 11/28 280/124.157 |

(Continued)

FOREIGN PATENT DOCUMENTS

| | | |
|---|---|---|
| CN | 101876300 A | 11/2010 |
| DE | 102015016946 A | 12/2015 |

(Continued)

OTHER PUBLICATIONS

Notification of Transmittal, International Search Report and Written Opinion of International Searching Authority relating to PCT/US2023/031330 dated Dec. 11, 2023 (13 pages).

*Primary Examiner* — Toan C To
(74) *Attorney, Agent, or Firm* — Harness, Dickey & Pierce, P.L.C.

(57) ABSTRACT

An air-spring assembly includes a flexible bellows extending from a top end to a bottom end and enclosing an air-spring chamber between the top end and the bottom end, a first panel partially defining the air-spring chamber and movable in response to a pressure of the air-spring chamber, an enclosure partially defining a working chamber fluidly isolated from the air-spring chamber, a second panel partially defining the working chamber and movable relative to the enclosure, and a linkage member fixed relative to the first panel and to the second panel and defining a fixed distance between the first panel and the second panel. The top and bottom ends are fixable to a frame and a wheel of a vehicle, respectively. A volume of the air-spring chamber varies with movement of the bottom end relative to the top end. Movement of the second panel changes a volume of the working chamber.

18 Claims, 5 Drawing Sheets

(56) References Cited

U.S. PATENT DOCUMENTS

| | | | | |
|---|---|---|---|---|
| 6,386,524 B1* | 5/2002 | Levy | ............... | F16F 9/057 |
| | | | | 267/64.27 |
| 8,740,577 B2 | 6/2014 | Herges | | |
| 8,807,576 B2 | 8/2014 | Koeske | | |
| 8,844,912 B2 | 9/2014 | Naber | | |
| 9,334,916 B2* | 5/2016 | Neitzel | ............ | F16F 9/052 |
| 10,525,785 B2* | 1/2020 | Rose | ............... | F16F 9/04 |
| 12,135,069 B2* | 11/2024 | Nguyen | ............ | F16F 9/0409 |
| 2003/0067103 A1* | 4/2003 | Easter | ............ | B60G 17/0528 |
| | | | | 267/64.11 |
| 2010/0127438 A1* | 5/2010 | Eise | ............... | F16F 9/057 |
| | | | | 267/124 |
| 2013/0093132 A1* | 4/2013 | Street | ............ | B60G 11/62 |
| | | | | 29/896.9 |
| 2014/0054833 A1* | 2/2014 | Neitzel | ............ | F16F 9/057 |
| | | | | 267/64.27 |
| 2020/0238777 A1* | 7/2020 | Delorenzis | ............ | B60G 13/10 |
| 2021/0172494 A1* | 6/2021 | Ehrich | ............ | F16F 9/04 |
| 2023/0069024 A1* | 3/2023 | Delorenzis | ............ | B60G 11/27 |

FOREIGN PATENT DOCUMENTS

| | | | |
|---|---|---|---|
| DE | 102019130191 A1 | 5/2021 | |
| EP | 1833717 A1 | 9/2007 | |
| JP | 2020172159 A | 10/2020 | |
| KR | 100827640 B1 | 5/2008 | |
| KR | 102266940 B1 | 6/2021 | |

* cited by examiner

AIR-SPRING ASSEMBLY

BACKGROUND

Air suspension is a type of vehicle suspension powered by an air pump or compressor. The compressor pumps air into a flexible bellows, usually made from textile-reinforced rubber. Air suspension is generally used in place of conventional steel springs in heavy vehicle such as buses and trucks, and in some passenger cars.

SUMMARY

An air-spring assembly for a vehicle includes a flexible bellows, a first panel, an enclosure, a second panel, and a linkage member. The flexible bellows extends from a top end to a bottom end and encloses an air-spring chamber between the top end and the bottom end. The top end is fixable to a frame of the vehicle. The bottom end is fixable to a wheel of the vehicle. A volume of the air-spring chamber varies with movement of the bottom end relative to the top end. The first panel partially defines the air-spring chamber and is movable in response to a pressure of the air-spring chamber. The enclosure partially defines a working chamber fluidly isolated from the air-spring chamber. The second panel partially defines the working chamber and is movable relative to the enclosure. Movement of the second panel changes a volume of the working chamber. The linkage member is fixed relative to the first panel and to the second panel and defines a fixed distance between the first panel and the second panel.

In an example, an area of the first panel exposed to the air-spring chamber may be greater than an area of the second panel exposed to the working chamber.

In an example, the enclosure may be positioned inside the flexible bellows.

In an example, the air-spring assembly may further include a spring extending from a first end to a second end, the first end may be fixed relative to the first panel, and the second end may be fixed relative to the enclosure.

In an example, a first surface of the first panel may be exposed to the air-spring chamber, and a second surface of the first panel opposite the first surface is exposed to ambient air pressure.

In an example, a first surface of the second panel may be exposed to the working chamber, and a second surface of the second panel opposite the first surface may be exposed to ambient air pressure.

In an example, the air-spring assembly may further include an ambient chamber partially defined by the second panel and partially defined by the first panel, and a passageway connecting the ambient chamber to an ambient environment. In a further example, the ambient chamber may be positioned inside the flexible bellows. In a further example, the ambient chamber may be fluidly isolated from the air-spring chamber.

In an example, the first panel is a membrane.
In an example, the second panel is a membrane.
In an example, the second panel is a piston.

In an example, the air-spring assembly may further include a check valve positioned to permit airflow to exit the working chamber and block airflow from entering the working chamber. In a further example, the check valve may lead to a location external to the flexible bellows.

In an example, the air-spring assembly may further include a check valve positioned to permit airflow to enter the working chamber from an ambient environment and block airflow from exiting the working chamber.

In an example, the air-spring chamber may contain pressurized air, and a first surface of the first panel is exposed to the pressurized air.

In an example, the enclosure may be fixed relative to the top end of the flexible bellows.

In an example, the first panel may be positioned inside the flexible bellows.

DETAILED DESCRIPTION

Figure 1:
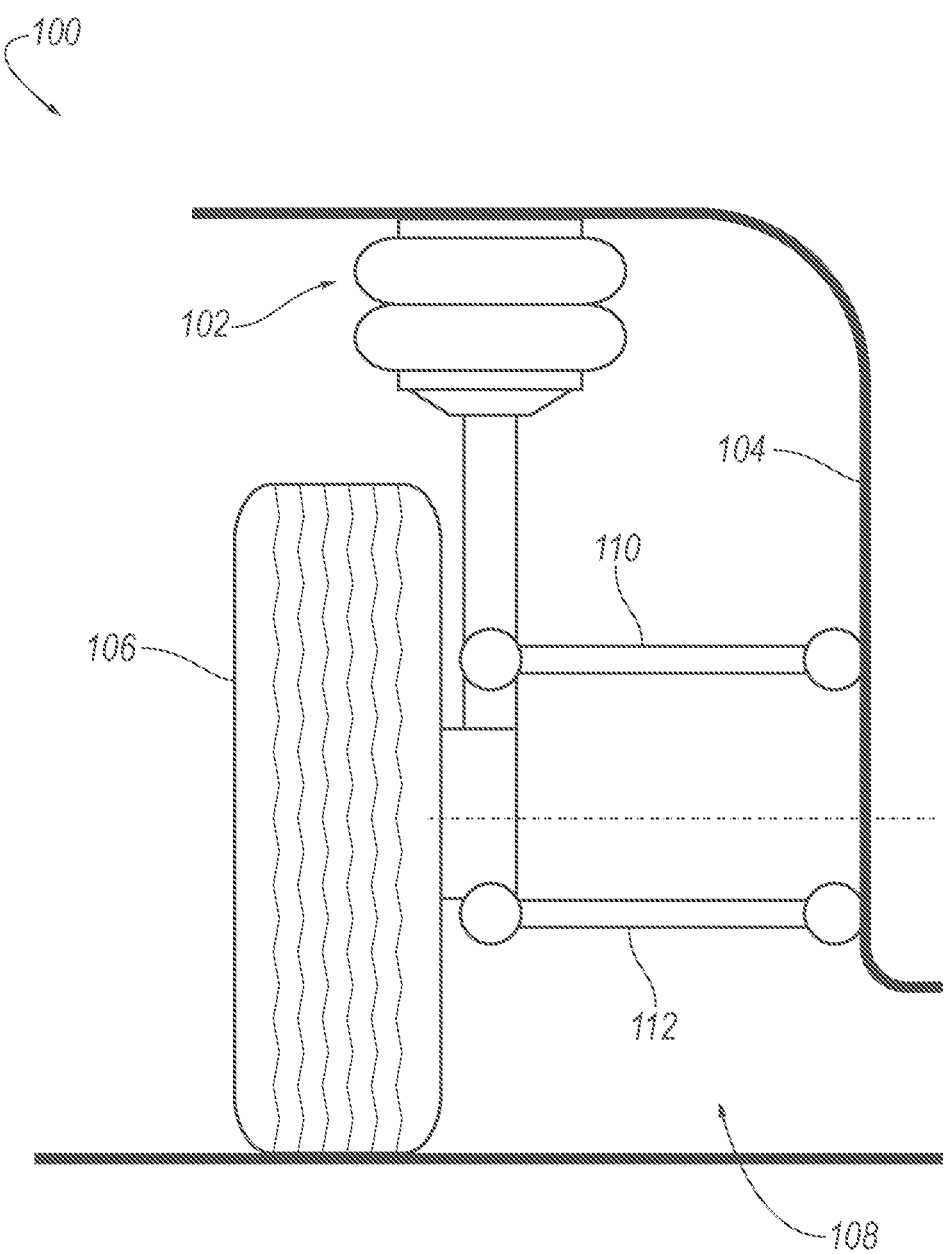
FIG. 1 is a diagrammatic view of an example suspension system on a vehicle.

With reference to the Figures, wherein like numerals indicate like parts throughout the several views, an air-spring assembly 102 for a vehicle 100 includes a flexible bellows 300, a first panel 302, an enclosure 304, a second panel 306, and a linkage member 308. The flexible bellows 300 extends from a top end 310 to a bottom end 312 and encloses an air-spring chamber 314 between the top end 310 and the bottom end 312. The top end 310 is fixable to a frame 104 of the vehicle 100. The bottom end 312 is fixable to a wheel 106 of the vehicle 100. A volume of the air-spring chamber 314 varies with movement of the bottom end 312 relative to the top end 310. The first panel 302 partially defines the air-spring chamber 314 and is movable in response to a pressure of the air-spring chamber 314. The enclosure 304 partially defines a working chamber 316 fluidly isolated from the air-spring chamber 314. The second panel 306 partially defines the working chamber 316 and is movable relative to the enclosure 304. Movement of the second panel 306 changes a volume of the working chamber 316. The linkage member 308 is fixed relative to the first panel 302 and to the second panel 306 and defines a fixed distance between the first panel 302 and the second panel 306.

In addition to the typical use for an air spring of dampening road vibrations transmitted from the wheel 106 to the frame 104 of the vehicle 100, the air-spring assembly 102 described herein can use road vibrations to harvest compressed air for later use. The compressed air can have multiple uses on board the vehicle 100, for example, re-pressurizing the flexible bellows 300. The fluid isolation of the working chamber 316 from the air-spring chamber 314 permits the air-spring assembly 102 to harvest compressed air from road vibrations even though the road vibrations can be low-frequency harmonic oscillations or chaotic oscillations. The combination of the first panel 302, the second panel 306, and the linkage member 308 may provide a mechanical advantage in harvesting the compressed air.

With reference to FIG. 1, the vehicle 100 may be any passenger or commercial automobile such as a car, a truck, a sport utility vehicle, a crossover, a van, a minivan, a taxi, a bus, etc.

The vehicle 100 includes the frame 104. The vehicle 100 may be of a unibody construction, in which the frame 104 and a body of the vehicle 100 are a single component. The vehicle 100 may, alternatively, be of a body-on-frame construction, in which the frame 104 supports the body that is a separate component from the frame 104. The frame 104 may include multiple components, e.g., a primary frame and one or more subframes. The frame 104 and the body may be formed of any suitable material, for example, steel, aluminum, etc.

The vehicle 100 includes a plurality of the wheels 106. The wheels 106 provide the points of contact for the vehicle 100 with the road. As the vehicle 100 travels, the wheels 106 receive vibrations from the road.

The vehicle 100 includes a suspension system 108. The suspension system 108 is coupled to the frame 104 and to each wheel 106. The suspension system 108 absorbs and dampens shocks and vibrations from the wheel 106 to the frame 104. For each wheel 106, the suspension system 108 may include at least an upper control arm 110, a lower control arm 112, and the air-spring assembly 102. The suspension system 108 is arranged so that an upward motion of the wheel 106, such as when the tire hits a bump while the vehicle 100 is in motion, compresses the flexible bellows 300 of the air-spring assembly 102 and so that a downward motion of the wheel 106 extends the flexible bellows 300. The air-spring assembly 102 may exert a force that is a function of a difference between the current length of the flexible bellows 300 and a relaxed length of the flexible bellows 300 and/or a speed of compression or extension of the flexible bellows 300.

Figure 2:
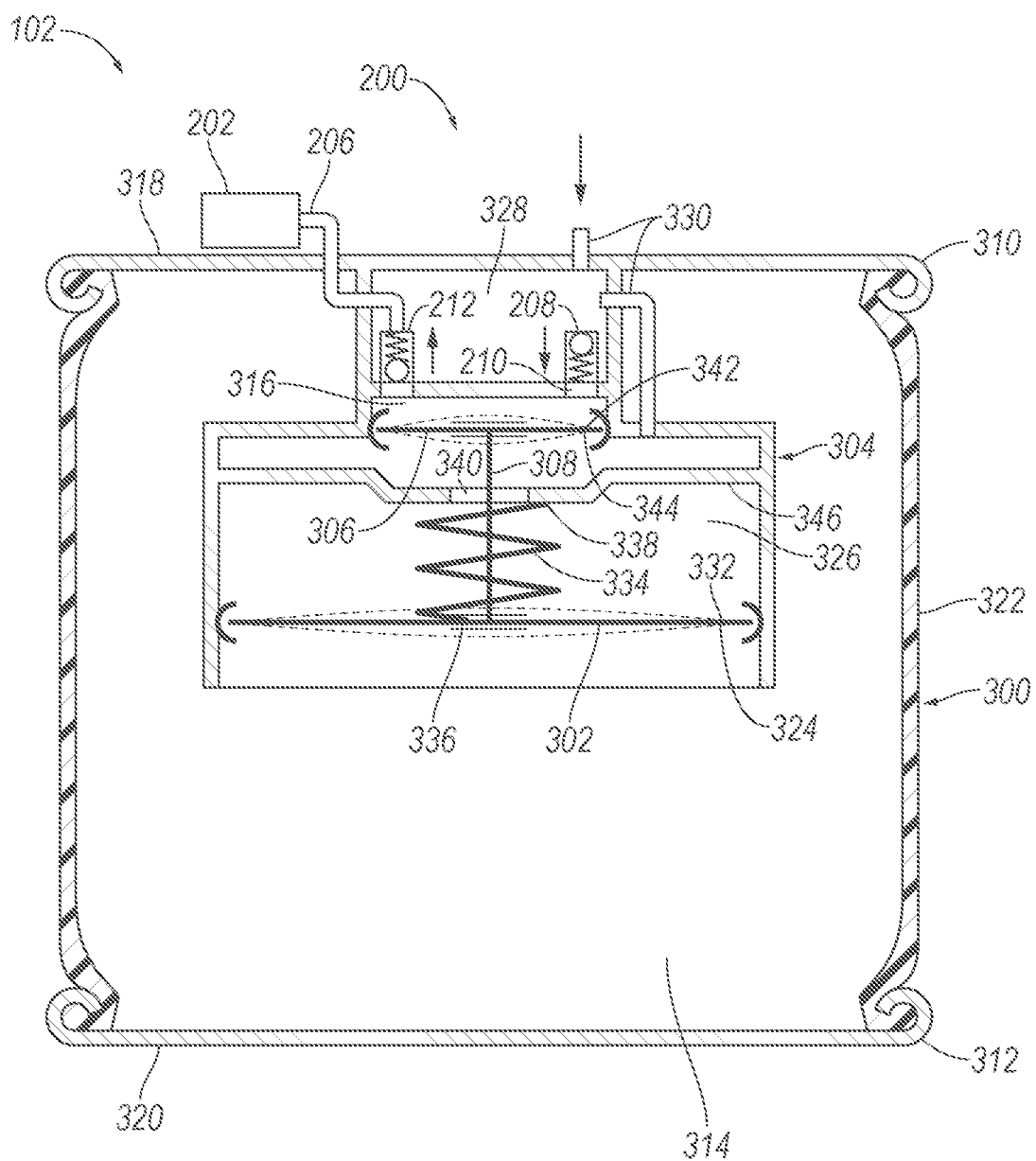
FIG. 2 is a side cross-sectional view of an example flexible bellows and harvester of the air-spring assembly.

With reference to FIG. 2, a harvester 200 includes the first panel 302, the enclosure 304, the second panel 306, and the linkage member 308. The harvester 200 is arranged to draw air from an ambient environment through a first check valve 208 into the working chamber 316 in response to low pressure in the working chamber 316. A check valve is a valve that permits flow in one direction and blocks flow in the opposite direction, also called a nonreturn valve or a one-way valve. For example, the air-spring assembly 102 may include an inlet 210 fluidly connecting the ambient environment and the working chamber 316, and the first check valve 208 may be positioned in the inlet 210 to permit one-way flow from the ambient environment through the inlet 210 into the working chamber 316. The harvester 200 is further arranged to expel air from the working chamber 316 through a second check valve 212 to a location 202 external to the flexible bellows 300 in response to high pressure in the working chamber 316. For example, the second check valve 212 may be positioned to permit one-way flow from the working chamber 316 to exit the flexible bellows 300.

The flexible bellows 300 includes the top end 310 fixable to the frame 104 and the bottom end 312 fixable to one of the wheels 106. The flexible bellows 300 extends from the top end 310 to the bottom end 312. For example, the flexible bellows 300 may include a top panel 318 at the top end 310, a bottom panel 320 at the bottom end 312, and a bellows body 322 extending from the top panel 318 to the bottom panel 320. The top panel 318 and the bottom panel 320 may be rigid. The bellows body 322 may be an elastomeric material such as textile-reinforced rubber. The bellows body 322 may be generally tube shaped, with the tube shape elongated from the top panel 318 to the bottom panel 320.

The flexible bellows 300 encloses the air-spring chamber 314 between the top end 310 and the bottom end 312. The flexible bellows 300, e.g., the top panel 318, the bottom panel 320, and the bellows body 322, at least partially define the air-spring chamber 314. For example, an interior of the flexible bellows 300, an exterior of the enclosure 304, and a first surface 324 of the first panel 302 may define the air-spring chamber 314.

The air-spring chamber 314 can be pressurized, i.e., can contain pressurized air, i.e., air at an air pressure maintained above the ambient air pressure. A volume of the air-spring chamber 314 varies with movement of the bottom end 312 relative to the top end 310. For example, the bottom panel 320 can move upward and downward relative to the top panel 318, and the bellows body 322 can correspondingly compress or extend along a vertical axis. The air pressure of the air-spring chamber 314 varies with the volume, increasing as the volume decreases and decreasing as the volume increases. The air-spring chamber 314 can be sealed other than to receive air from a pressurized air source.

The enclosure 304 can be positioned inside the flexible bellows 300. For example, the enclosure 304 can be positioned between the top panel 318 and the bottom panel 320 and within an interior of the bellows body 322. The flexible bellows 300 can be fixed relative to the top end 310 of the flexible bellows 300. For example, the enclosure 304 can be fixed to the top panel 318, e.g., integral with the top panel 318. The enclosure 304 encloses the working chamber 316, and the enclosure 304 may enclose at least one ambient chamber, 326, 328, e.g., a first ambient chamber 326 and a second ambient chamber 328. Alternatively, the enclosure 304 may be positioned outside the flexible bellows 300.

The enclosure 304 partially defines the working chamber 316. For example, an interior of the enclosure 304 and a first surface 342 of the second panel 306 may define the working chamber 316. The working chamber 316 may be fluidly isolated from the air-spring chamber 314, i.e., no airflow path exists from the working chamber 316 to the air-spring chamber 314 or vice versa. The working chamber 316 may be sealed other than the first check valve 208 and the second check valve 212. The working chamber 316 may be positioned inside the flexible bellows 300, thereby providing a compact, space-saving design for the air-spring assembly 102. Movement of the second panel 306 changes a volume of the working chamber 316, thereby changing the pressure of the working chamber 316.

The enclosures 304 can partially define the ambient chambers 326, 328. The first panel 302 and/or the second panel 306 may also partially define the ambient chambers 326, 328. For example, an interior of the enclosure 304, a second surface 332 of the first panel 302, and a second surface 344 of the second panel 306 may define the first ambient chamber 326. An interior of the enclosure 304 and a bottom of the top panel 318 may define the second ambient chamber 328. The ambient chambers 326, 328 are fluidly isolated from the air-spring chamber 314. The ambient chambers 326, 328 may be positioned inside the flexible bellows 300, thereby providing a compact, space-saving design for the air-spring assembly 102. The air-spring assembly 102 may include one or more passageways 330 fluidly connecting the ambient chambers 326, 328 to the ambient environment, e.g., one passageway 330 fluidly connecting the first ambient chamber 326 and the second ambient chamber 328 and another passageway 330 fluidly connecting the second ambient chamber 328 to outside the flexible bellows 300. The passageways 330 may be open, i.e., freely permitting airflow between the ambient environment and the ambient chambers 326, 328. The ambient chambers 326, 328 can thereby have an air pressure approximately equal to the ambient air pressure.

The first panel 302 is positioned inside the flexible bellows 300. The first panel 302 is positioned to fluidly separate the air-spring chamber 314 and the first ambient chamber 326. The first panel 302 can partially define the air-spring chamber 314 with the first surface 324 of the first panel 302 exposed to the air-spring chamber 314. The first surface 324 is thereby exposed to the pressurized air inside the air-spring chamber 314. The first panel 302 can partially define the first ambient chamber 326 with the second surface 332 of the first panel 302 exposed to the first ambient chamber 326. The second surface 332 is opposite the first surface 324. The second surface 332 is thereby exposed to ambient air pressure.

Figure 3A:
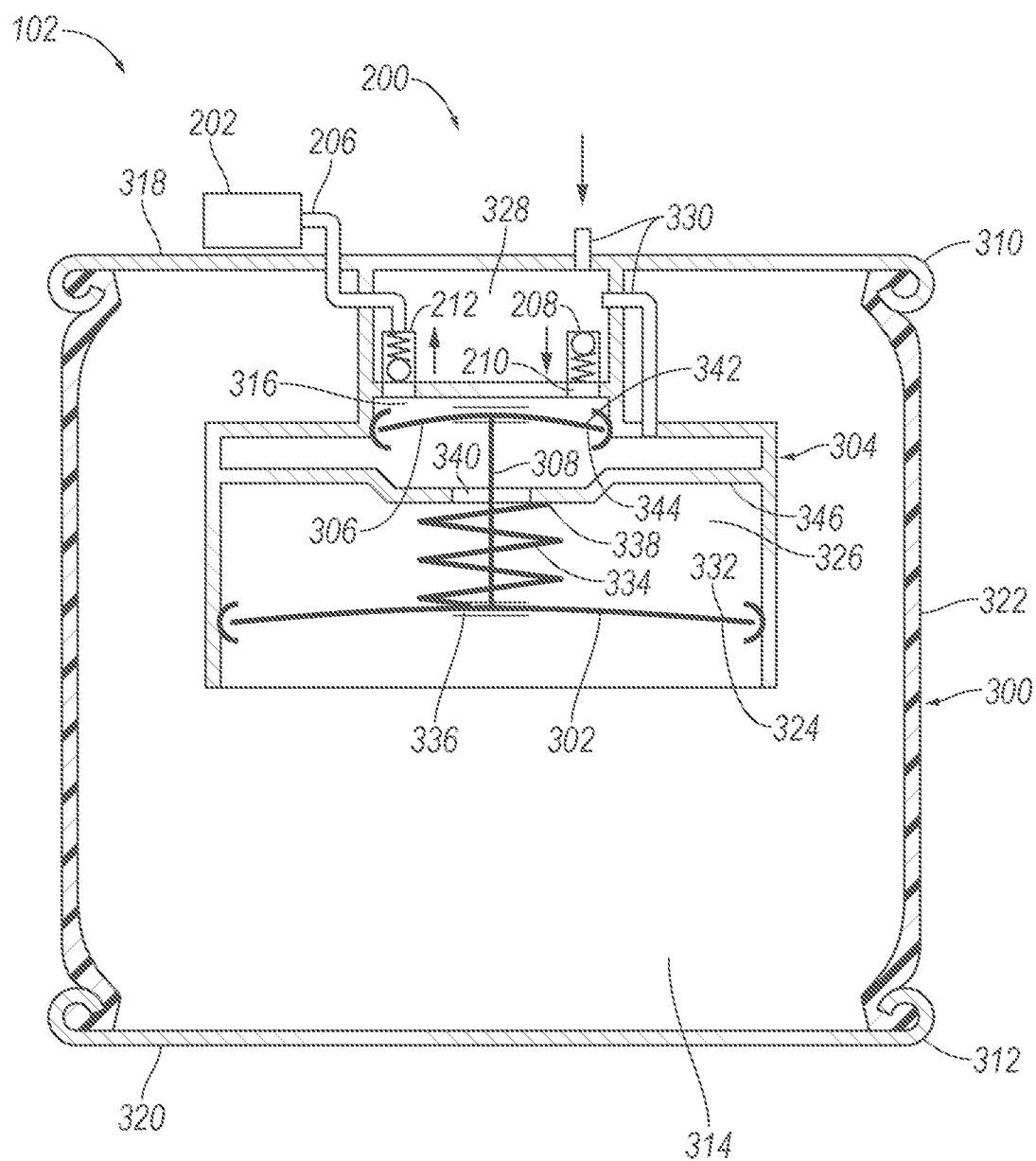
FIG. 3A is a side-cross-sectional view of the flexible bellows and harvester under compression.
Figure 3B:
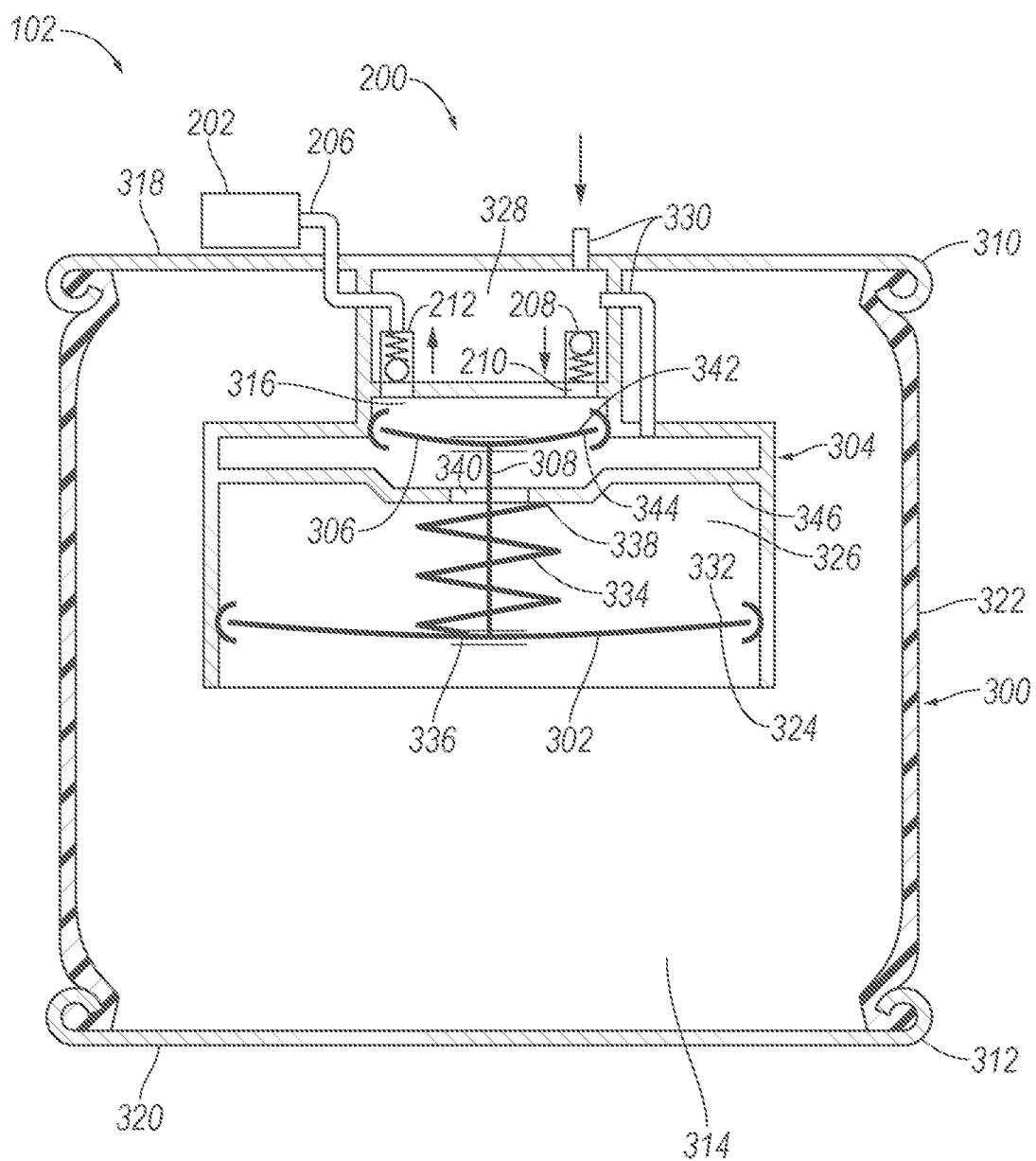
FIG. 3B is a side-cross-sectional view of the flexible bellows and harvester in extension.

The first panel 302 is movable in response to a pressure of the air-spring chamber 314. Movement of the first panel 302 changes the volumes of the air-spring chamber 314 and the first ambient chamber 326. For example, an increase in the pressure of the air-spring chamber 314 during compression pushes the first panel 302 in a direction tending to increase the volume of the air-spring chamber 314 and tending to decrease the volume of the first ambient chamber 326, as shown in FIG. 3A. A decrease in the pressure of the air-spring chamber 314 during extension pulls the first panel 302 in a direction tending to decrease the volume of the air-spring chamber 314 and tending to increase the volume of the first ambient chamber 326, as shown in FIG. 3B.

The first panel 302 can be a membrane, i.e., a thin, flexible sheet. The first panel 302 can be an elastomeric material. The first panel 302 can be comparatively more flexible than the bellows body 322. The first panel 302 can be sealed to the enclosure 304 at an edge of the first panel 302 extending completely around the first panel 302 by any suitable fixation. Movement of the first panel 302 can be caused by flexing of the first panel 302 inward or outward relative to the air-spring chamber 314 and the first ambient chamber 326, e.g., upward and downward in the orientation shown in the Figures.

The linkage member 308 is fixed relative to the first panel 302 and to the second panel 306. For example, the linkage member 308 can be elongated from the first panel 302 to the second panel 306. One end of the linkage member 308 can be fixed to the first panel 302 away from an edge of the first panel 302, and the other end of the linkage member 308 can be fixed to the second panel 306 away from an edge of the second panel 306. The linkage member 308 can be a rigid body, i.e., without internal moving parts. The linkage member 308 can define a fixed distance between the first panel 302 and the second panel 306, e.g., by being rigid and by being fixed to the first panel 302 and the second panel 306. Movement of the first panel 302 thereby imparts corresponding movement to the second panel 306 via the linkage member 308.

The second panel 306 is positioned inside the flexible bellows 300. The second panel 306 is positioned to fluidly separate the working chamber 316 and the first ambient chamber 326. The second panel 306 can partially define the working chamber 316 with the first surface 342 of the second panel 306 exposed to the working chamber 316. The first surface 342 is thereby exposed to the air inside the working chamber 316. The second panel 306 can partially define the first ambient chamber 326 with the second surface 344 of the second panel 306 exposed to the first ambient chamber 326. The second surface 344 is opposite the first surface 342. The second surface 344 is thereby exposed to ambient air pressure.

The second panel 306 is movable relative to the enclosure 304, e.g., in response to pushing or pulling by the linkage member 308. Movement of the second panel 306 changes the volumes of the working chamber 316 and the first ambient chamber 326. For example, movement by the linkage member 308 toward the second panel 306 pushes the second panel 306 in a direction tending to decrease the volume of the working chamber 316 and tending to increase the volume of the first ambient chamber 326, as shown in FIG. 3A. Movement by the linkage member 308 away from the second panel 306 pulls the second panel 306 in a direction tending to increase the volume of the working chamber 316 and tending to decrease the volume of the first ambient chamber 326, as shown in FIG. 3B. Because of the simultaneous movement by the first panel 302, the net change in volume for the first ambient chamber 326 may still be an increase.

The second panel 306 can be a membrane, i.e., a thin, flexible sheet. The second panel 306 can be an elastomeric material. The second panel 306 can be comparatively more flexible than the bellows body 322. The second panel 306 can be attached on an interior of the enclosure 304. The second panel 306 can be sealed to the enclosure 304 at an edge of the second panel 306 extending completely around the second panel 306. Movement of the second panel 306 can be caused by flexing of the second panel 306 inward or outward relative to the working chamber 316 and the first ambient chamber 326, e.g., upward and downward in the orientation shown in FIGS. 2-3B.

Figure 4:
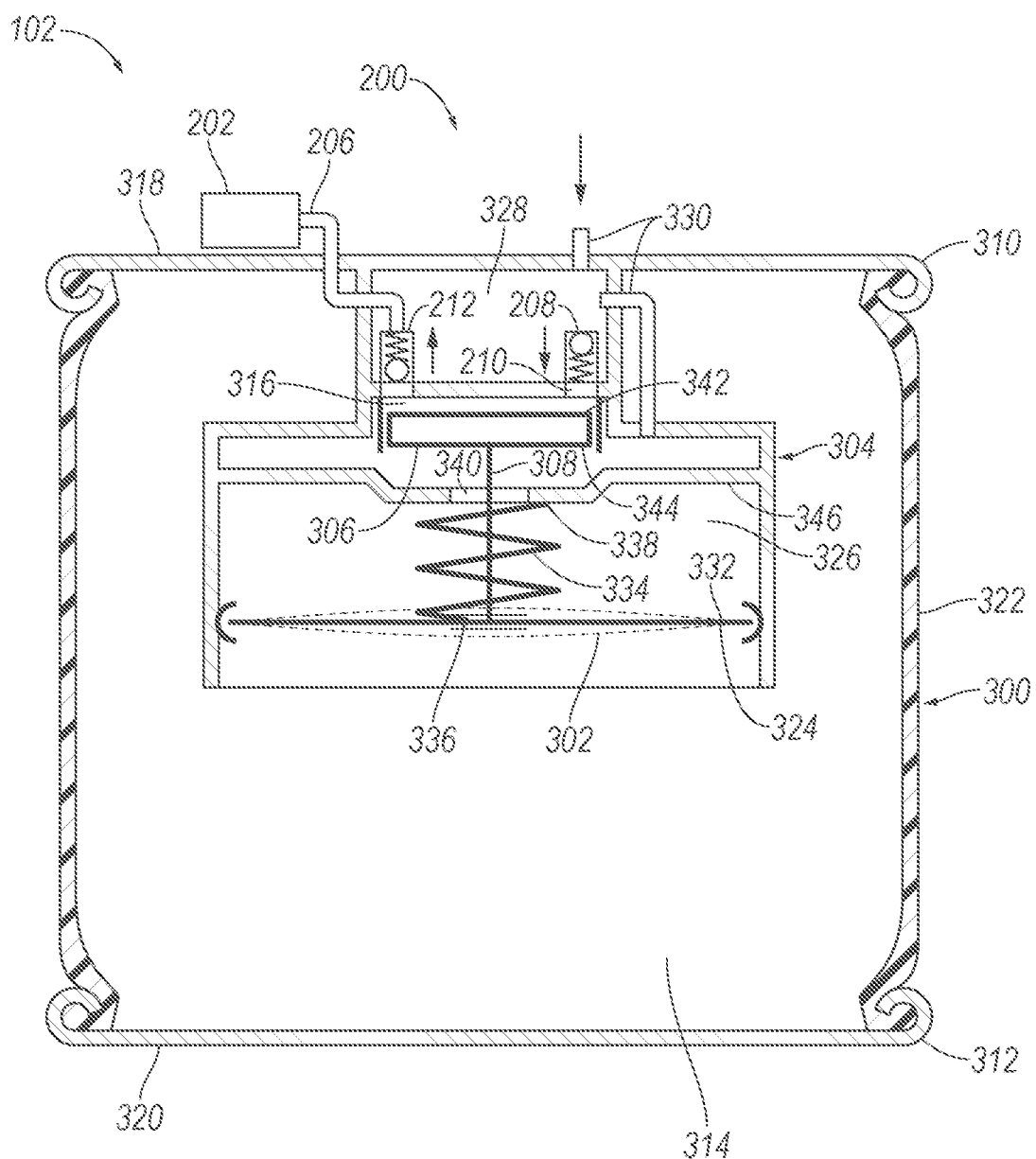
FIG. 4 is a side cross-sectional view of another example flexible bellows and harvester of the air-spring assembly.

Alternatively, the second panel 306 can be a piston, as shown in FIG. 4. The second panel 306 can be a rigid body. The second panel 306 can be positioned on an interior of the enclosure 304. The second panel 306 can form a seal with the enclosure 304 around an edge of the second panel 306 extending completely around the second panel 306. Movement of the second panel 306 can be caused by sliding of the second panel 306 relative to the enclosure 304 inward or outward relative to the working chamber 316 and the first ambient chamber 326, e.g., upward and downward in the orientation shown in FIG. 4.

An area of the first panel 302 exposed to the air-spring chamber 314 can be greater than an area of the second panel 306 exposed to the working chamber 316. The difference in areas provides a mechanical advantage that can deliver greater pressure. The difference in areas means that an increase in pressure in the air-spring chamber 314 can cause a pressure in the working chamber 316 that is higher than the current pressure of the air-spring chamber 314. The force applied to the first surface 324 of the first panel 302 is a product of the pressure of the air-spring chamber 314 and the area of the first panel, i.e., $P_{as}A_1$, in which $P_{as}$ is the instantaneous pressure of the air-spring chamber 314 and $A_1$ is the area of the first panel 302. The force applied to the first surface 342 of the second panel 306 is a product of the pressure of the working chamber 316 and the area of the second panel 306, i.e., $P_wA_2$, in which $P_w$ is the instantaneous pressure of the working chamber 316 and $A_2$ is the area of the second panel 306. The area $A_1$ being greater than the area $A_2$ permits the pressure $P_w$ to be correspondingly greater than the pressure $P_{as}$.

The first check valve 208 can be positioned to permit airflow to enter the working chamber 316 from the ambient environment and block airflow from exiting the working chamber 316. For example, the first check valve 208 can fluidly connect the second ambient chamber 328 to the working chamber 316 and can be oriented to permit airflow from the second ambient chamber 328 into the working chamber 316.

The second check valve 212 can be positioned to permit airflow to exit the working chamber 316 and block airflow from entering the working chamber 316. For example, the second check valve 212 can fluidly connect the working chamber 316 to the location 202 external to the flexible bellows 300 and can be oriented to permit airflow from the working chamber 316 to the location 202.

The air-spring assembly 102 may include a spring 334. The spring 334 extends from a first end 336 to a second end 338. The first end 336 can be fixed relative to the first panel 302, and the second end 338 can be fixed relative to the enclosure 304. For example, the second end 338 can be attached to an attachment panel 346 of the enclosure 304. The attachment panel and the spring 334 can be positioned in the first ambient chamber 326. The attachment panel may include a gap 340 through which the linkage member 308 passes. The spring 334 may be any suitable type, e.g., a spiral compression spring. The spring 334 may be coiled around the linkage member 308. The spring 334 may be positioned to bias the volume of the working chamber 316 to a specific volume via the first panel 302, the linkage member 308, and the second panel 306. For example, the spring 334 may be positioned to bias the working chamber 316 to a comparatively greater volume than when the flexible bellows 300 experiences a compression.

FIG. 3A shows the air-spring assembly 102 when the flexible bellows 300 is compressed by a road feature. The volume of the air-spring chamber 314 decreases, thereby increasing the pressure of the air-spring chamber 314. The greater pressure pushes against the first surface 324 of the first panel 302, moving the first panel 302 upward. The linkage member 308 correspondingly moves upward, and the spring 334 compresses. The movement of the linkage member 308 pushes the second panel 306 upward, decreasing a volume of the working chamber 316. The first check valve 208 blocks airflow from exiting the working chamber 316. The second check valve 212 permits the now-compressed air in the working chamber 316 to exit to the location 202 external to the flexible bellows 300.

FIG. 3B shows the air-spring assembly 102 after the compressing force is removed from the flexible bellows 300. The spring 334, which was compressed during the compression of the flexible bellows 300, pushes the first panel 302 back downward to a resting position. The linkage member 308 correspondingly moves downward. The movement of the linkage member 308 pulls the second panel 306 downward, increasing a volume of the working chamber 316. The pressure of the working chamber 316 is thereby decreased below the ambient air pressure. The first check valve 208 permits ambient air to enter the working chamber 316. The second check valve 212 blocks air from the location 202 from reentering the working chamber 316.

The disclosure has been described in an illustrative manner, and it is to be understood that the terminology which has been used is intended to be in the nature of words of description rather than of limitation. The adjectives "first," "second," and "third" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. An air-spring assembly comprising:
a flexible bellows extending from a top end to a bottom end and enclosing an air-spring chamber between the top end and the bottom end, the top end fixable to a frame of a vehicle, the bottom end fixable to a wheel of the vehicle, a volume of the air-spring chamber varying with movement of the bottom end relative to the top end;
a first panel partially defining the air-spring chamber and movable in response to a pressure of the air-spring chamber;
an enclosure partially defining a working chamber fluidly isolated from the air-spring chamber;
a second panel partially defining the working chamber and movable relative to the enclosure, movement of the second panel changing a volume of the working chamber; and
a linkage member fixed relative to the first panel and to the second panel and defining a fixed distance between the first panel and the second panel.

2. The air-spring assembly of claim 1, wherein an area of the first panel exposed to the air-spring chamber is greater than an area of the second panel exposed to the working chamber.

3. The air-spring assembly of claim 1, wherein the enclosure is positioned inside the flexible bellows.

4. The air-spring assembly of claim 1, further comprising a spring extending from a first end to a second end, wherein the first end is fixed relative to the first panel, and the second end is fixed relative to the enclosure.

5. The air-spring assembly of claim 1, wherein a first surface of the first panel is exposed to the air-spring chamber, and a second surface of the first panel opposite the first surface is exposed to ambient air pressure.

6. The air-spring assembly of claim 1, wherein a first surface of the second panel is exposed to the working chamber, and a second surface of the second panel opposite the first surface is exposed to ambient air pressure.

7. The air-spring assembly of claim 1, further comprising an ambient chamber partially defined by the second panel and partially defined by the first panel, and a passageway connecting the ambient chamber to an ambient environment.

8. The air-spring assembly of claim 7, wherein the ambient chamber is positioned inside the flexible bellows.

9. The air-spring assembly of claim 7, wherein the ambient chamber is fluidly isolated from the air-spring chamber.

10. The air-spring assembly of claim 1, wherein the first panel is a membrane.

11. The air-spring assembly of claim 1, wherein the second panel is a membrane.

12. The air-spring assembly of claim 1, wherein the second panel is a piston.

13. The air-spring assembly of claim 1, further comprising a check valve positioned to permit airflow to exit the working chamber and block airflow from entering the working chamber.

14. The air-spring assembly of claim 13, wherein the check valve leads to a location external to the flexible bellows.

15. The air-spring assembly of claim 1, further comprising a check valve positioned to permit airflow to enter the working chamber from an ambient environment and block airflow from exiting the working chamber.

16. The air-spring assembly of claim 1, wherein the air-spring chamber contains pressurized air, and a first surface of the first panel is exposed to the pressurized air.

17. The air-spring assembly of claim 1, wherein the enclosure is fixed relative to the top end of the flexible bellows.

18. The air-spring assembly of claim 1, wherein the first panel is positioned inside the flexible bellows.

\* \* \* \* \*